US011423438B2

(12) United States Patent
Barton

(10) Patent No.: US 11,423,438 B2
(45) Date of Patent: Aug. 23, 2022

(54) REAL-TIME ONLINE ASSET DISPLAY CAMPAIGN AUDITING SYSTEM

(71) Applicant: SteelWill Inc., San Francisco, CA (US)

(72) Inventor: James M Barton, Los Gatos, CA (US)

(73) Assignee: SteelWill Inc., San Francisco, CA (US)

( * ) Notice: Subject to any disclaimer, the term of this patent is extended or adjusted under 35 U.S.C. 154(b) by 0 days.

(21) Appl. No.: 16/922,995

(22) Filed: Jul. 7, 2020

(65) Prior Publication Data

US 2022/0012770 A1    Jan. 13, 2022

(51) Int. Cl.
*G06Q 30/02*    (2012.01)
*G06Q 50/26*    (2012.01)
*H04L 9/40*    (2022.01)

(52) U.S. Cl.
CPC ..... *G06Q 30/0248* (2013.01); *G06Q 30/0277* (2013.01); *G06Q 50/26* (2013.01); *H04L 63/083* (2013.01)

(58) Field of Classification Search
CPC .......... G06Q 30/0248; G06Q 30/0277; G06Q 50/26; H04L 63/083
See application file for complete search history.

(56) References Cited

U.S. PATENT DOCUMENTS

| | | | |
|---|---|---|---|
| 9,197,642 B1 * | 11/2015 | Urbach | H04L 67/38 |
| 10,140,630 B2 * | 11/2018 | Strompolos | G06Q 30/0249 |
| 2010/0131359 A1 * | 5/2010 | Ting | G06Q 30/02 705/14.47 |
| 2017/0124385 A1 * | 5/2017 | Ganong | G06F 16/50 |
| 2018/0097643 A1 * | 4/2018 | Raleigh | H04M 15/8094 |
| 2018/0268426 A1 * | 9/2018 | Mathew | H04W 4/02 |
| 2018/0359091 A1 * | 12/2018 | Puentes | H04L 63/0428 |
| 2019/0058591 A1 * | 2/2019 | Sharpe | H04L 9/3234 |
| 2019/0139170 A1 * | 5/2019 | Subramanian | G06Q 20/085 |

* cited by examiner

*Primary Examiner* — Scott C Anderson
(74) *Attorney, Agent, or Firm* — Wong & Rees LLP; Kirk D. Wong

(57) ABSTRACT

An online content asset distribution system tracks content asset consumption and detects fraudulent attempts to access online content assets. The system also tracks online asset campaigns such as online political campaigns.

20 Claims, 9 Drawing Sheets

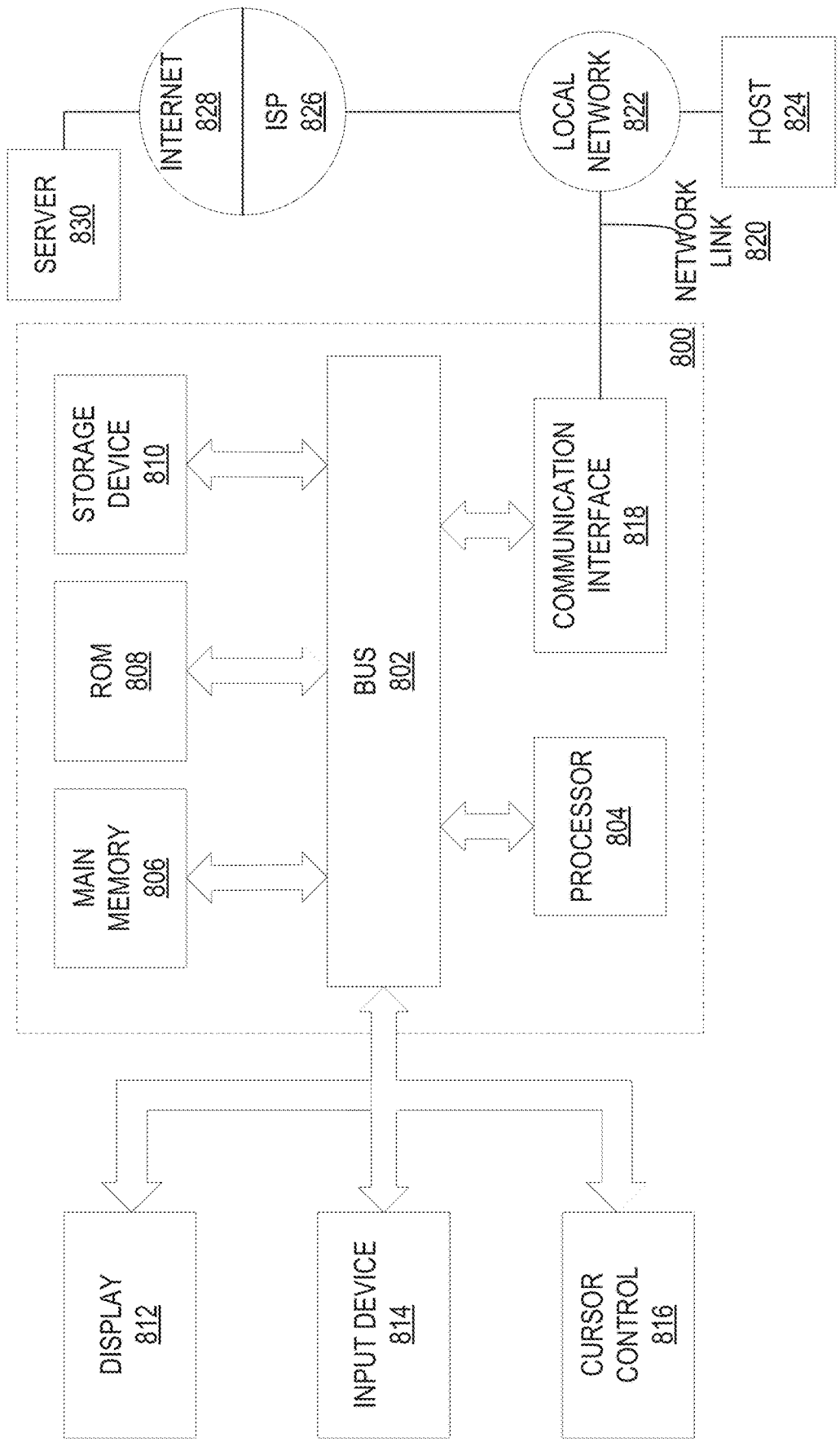

REAL-TIME ONLINE ASSET DISPLAY CAMPAIGN AUDITING SYSTEM

TECHNICAL FIELD

Embodiments relate generally to online asset display tracking, and, more specifically, to techniques for automatically auditing asset display campaigns in real-time.

BACKGROUND

Online asset displays on Web pages, such as advertisements, articles, audio assets, video assets, etc., are valuable commodities to both the Web page owner and the asset provider. For example, advertisements, in particular, are placed in Web page content such that a user that is visiting the Web page can view portions of the advertisements placed within the Web page content. Such views are called "impressions". The user may click on any of the advertisements and view a more complete advertisement or visit a Web page related to the advertisement. These user interactions are called "click-throughs." The number of impressions and click-throughs determines the renumeration that the Web page owner receives for displaying the advertisements on the Web page. These numbers are also a measurement for the advertisement provider that is used to determine the success of the advertisement itself and/or the advertisement campaign.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 is block diagram of a computer system upon which embodiments of the invention may be implemented.

DETAILED DESCRIPTION

Figure 1A:
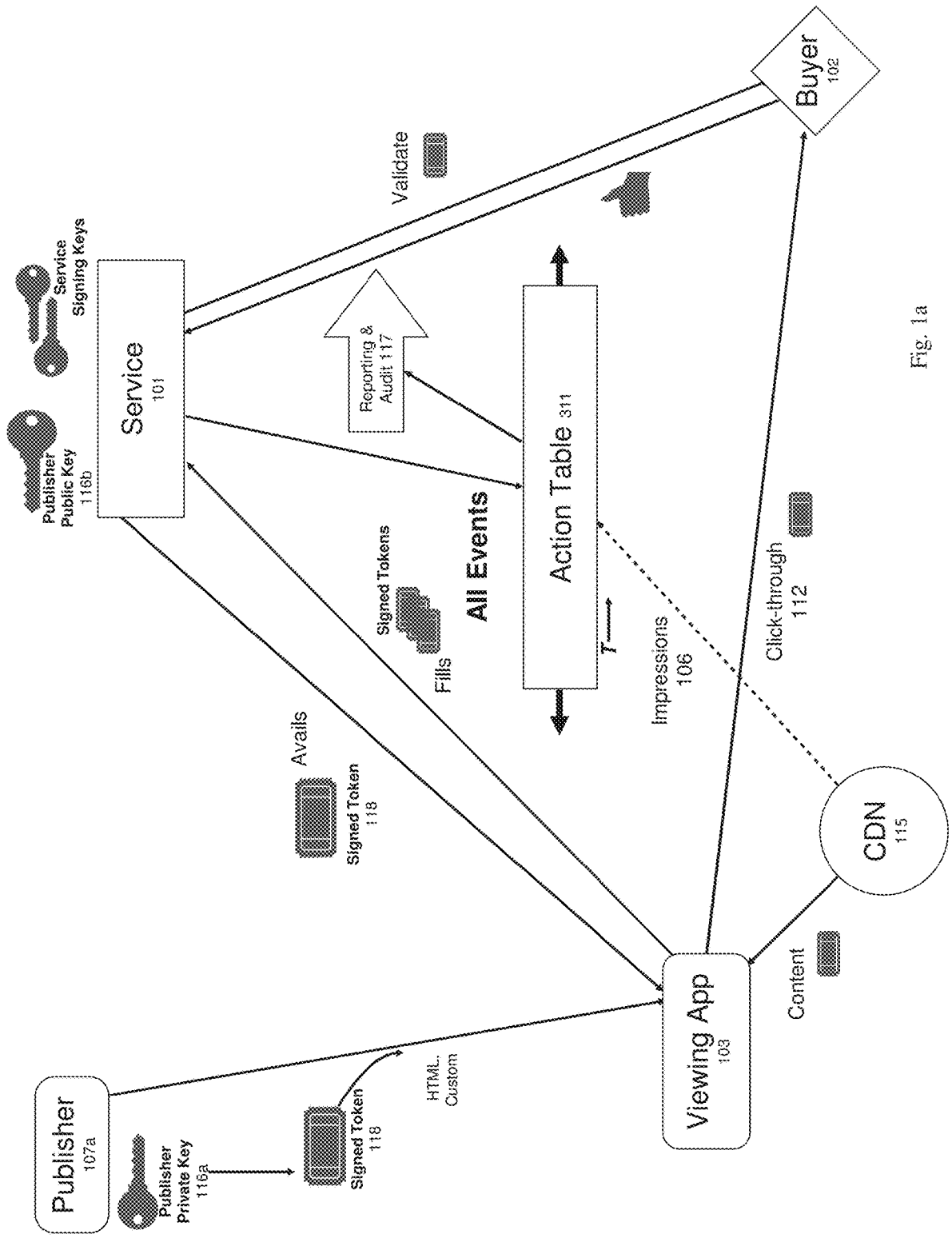
FIGS. 1a and 1b are block diagrams of an overview of an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0. General Overview
- 2.0. Structural Overview
  - 2.1. Service Interaction
    - 2.1.1. Data and API Model
      - 2.1.1.1. Entities
      - 2.1.1.2 Other Models
    - 2.1.3 Targeting
    - 2.1.2. Fraud Detection
      - 2.1.2.1. Workflow Examples
    - 2.1.3. Tracking Impressions
    - 2.1.4. Tracking Click-Throughs
  - 2.2. Test Webserver Example
    - 2.2.1. API Reference
    - 2.2.2. Asset/Ad Targeting in the Service
- 3.0. Implementation Mechanism—Hardware Overview
- 4.0. Extensions and Alternatives 1.0. General Overview This overview presents a basic description of some aspects of possible embodiments of the present invention. It should be noted that this overview is not an extensive or exhaustive summary of aspects of the possible embodiment. Moreover, it should be noted that this overview is not intended to be understood as identifying any particularly significant aspects or elements of the possible embodiments, nor as delineating any scope of any possible embodiment in particular, nor the invention in general. This overview merely presents some concepts that relate to the example possible embodiment in a condensed and simplified format and should be understood as merely a conceptual prelude to a more detailed description of example possible embodiments that follows below.

An embodiment is a new kind of online digital asset management system that is efficient for areas such as political messaging, advertising, etc. In sensitive areas such as the political digital arena, fraud prevention and messaging tracking is important. The system works directly with website or mobile app publishers having advertising inventory to sell in order to place political advertising where it can be most effective—within Web or mobile applications that address particular voter segments and sensibilities. Rather than attempting to target individuals through data collected about their behavior and preferences, the system targets publishers that address general areas of interest to voters.

At the same time, the system works directly with media buyers attempting to reach various voter communities with their message. The combination of demand-side and supply-side in one organization offers a number of advantages over existing online advertising markets:

- The system can develop custom campaigns that ensure the reach and effectiveness of a desired message.
- Direct relationships with publishers ensure that campaigns are executed as intended.
- The system can ensure that guidelines, requirements and regulations around political advertising are properly followed.
- Publishers can obtain maximum value for their inventory.
- Media buyers can maximize the effectiveness of their spending.

For advertising of all kinds, and especially for online advertising, accuracy of reporting about actual ad placement is core to managing an effective service. In particular, for political advertising, tracking all aspects of the operation of the service is critical to meet emerging requirements and standards. The first component of this, knowing the media buyers and ad publishers, is described above.

However, it is also important to assure that inventory is filled as specified such that attempts to game the system for profit or malicious purposes can be detected and thwarted and that a complete audit trail of targeting and placement activity is created. Further, an embodiment provides reporting on the progress of an asset/ad campaign in near real-time, both to more effectively manage the on-going campaign, and to provide quick detection of attacks on the integrity of the system.

2.0. Structural Overview

Embodiments disclosed herein implement the above capability by implementing a verifiable and immutable record of all ad serving activity. This includes, but is not limited to, inventory offers by publishers, filled inventory by the system, impressions generated by loading the inventory into the user interface, click-throughs and invalid or malicious activity detected by the system.

In order to offer this level of assurance and tracking, the system manages its own content delivery network, typically using the AWS Cloudfront Content Delivery Network (CDN) or other equivalent services, which allows accurate and timely placement of the desired content along with near real-time tracking of impressions.

In an embodiment, a technical foundation of these innovative capabilities is the use of state-of-the-art cryptographic signing techniques at every stage of the ad delivery and tracking process. In an embodiment, the vehicle for this tracking is the use of JSON Web Tokens (JWT), which is a public specification of cryptographically signed tokens containing assertions about the activity that is occurring. These tokens are attached to information flowing through the system to inform it about these activities and verify that the operations are valid. The data included in such tokens is in the clear; the token signature provides a way to verify that no tampering with the data in the token has occurred.

In an embodiment, the system may instead use encrypted tokens rather than signed tokens. In general, signed tokens are simpler to generate, and a simple assertion of validity of the data in the token is sufficient for the system to operate correctly. In some cases, it may be beneficial to require the more complex encryption of the data in the token. Doing so does not change any aspect of the described system operation.

The securing of the system begins with each website or mobile app publisher being issued a public/private key pair for token signing. An embodiment retains a copy of the public key, while the private key is kept secret by the publisher. This private key is used by the publisher to generate a signed token that is embedded in the Web page or mobile application. When the page is viewed, or the mobile app is opened, the token is attached to an inventory offer that is transmitted to the system.

In an embodiment, a single secret key may be issued to the publisher by the system and used to sign the token. This creates a less secure token, as the key must be kept secret by both parties, and the token itself may become easier to alter. However, generating a signed token using a private key is much simpler than generating a cryptographically signed token, and may be appropriate in early stages of adoption of this technique by a publisher.

The system server verifies the publisher using the saved public or secret key and provides to the application a set of one or more content URLs for filling the available inventory, each including a unique service-signed token. Any click-through URLs provided will also include a service-signed token. Loading the content URL for an impression is logged along with the service-signed token, providing the next step in tracking usage. If a click-through URL is opened, the service again records the activity before redirecting the application to the desired location. Even here, though, the redirection is again signed with a unique token, which the receiver may easily verify with the system.

Thus, every transaction is signed and tracked at every stage, generating a complete audit trail of each of placements, impressions, and click-throughs. Tokens have limited lifetime to reduce replay attacks and may include additional verification information.

Using the audit trail of activity, the system can generate real-time dashboards of asset placement activity and accurate billing records. Further, this audit trail can be continually monitored for suspicious activity to detect attacks and attempted subversion.

Asset/Ad Placement Services

Figure 1B:
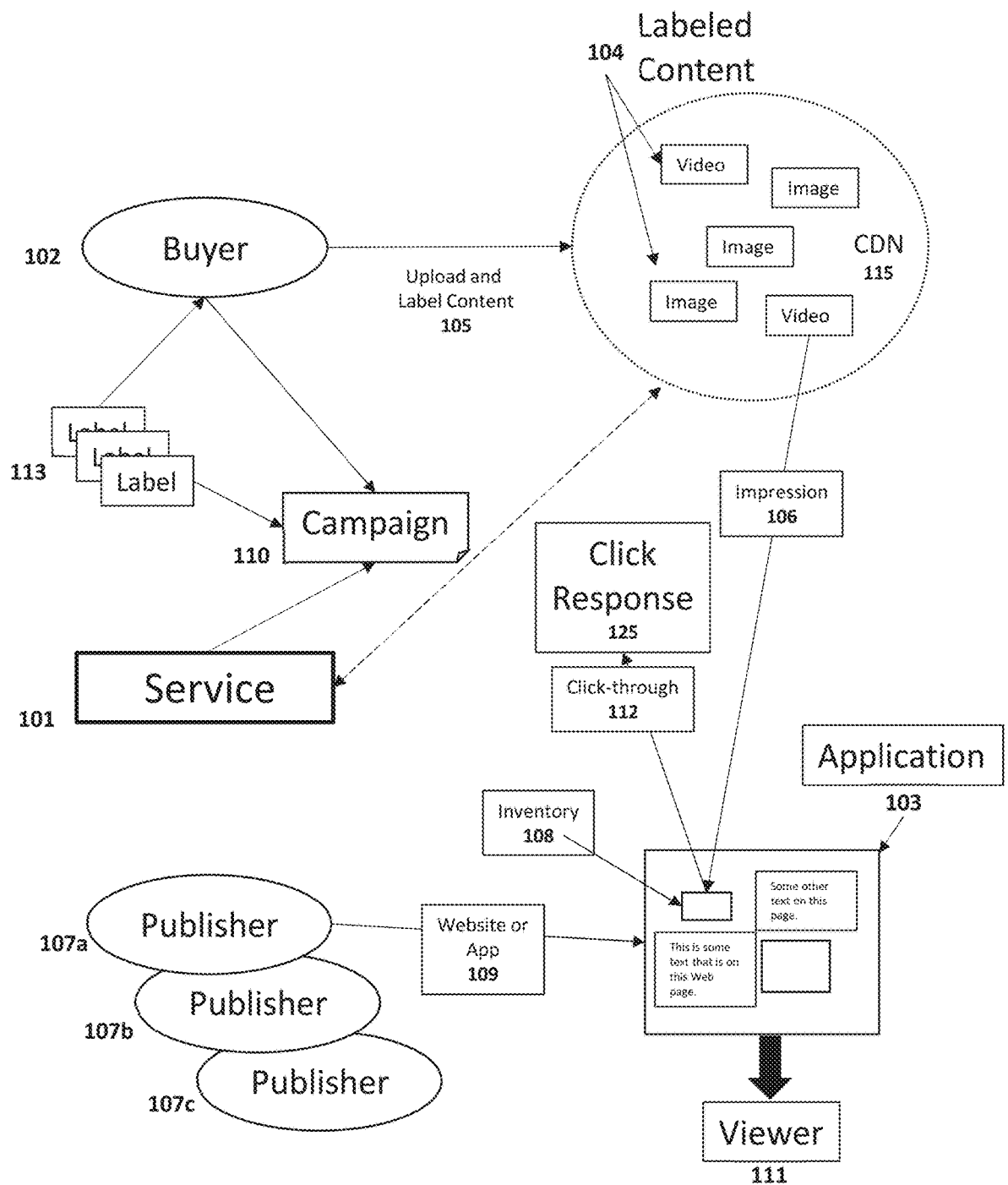

Referring to FIGS. 1a and 1b, in an embodiment, available inventory (often called avails) for system assets or advertisements is marked as such via specific tags on those avails; the service 101 does not try to fill all avails, just those specifically designated. An instruction to the application to fill an avail is called a fill or placement. Because of the direct relationship between targeted publishers and the service, publishers get a higher payment for each placement, so it is expected that the service code has the first opportunity to fill these avails.

Typically, the publisher side of the service is implemented via a small Javascript script inserted into the header of the Web page, via a small system SDK for mobile devices, etc. If no campaign is active that would trigger a placement for these avails, the inserted code can call out to publisher code (if provided) that refers the avail to other ad/asset placement services.

User Device Web Page Implementation

In an embodiment, a repository contains example source code implementing both header asset/ad insertion needed for interacting with the service, and a webserver using this insertion code for demonstration and testing purposes.

The header code that performs this activity can be written in standard Javascript. It may be directly included in the header of a web page or it may be loaded via an html link tag.

The header code relies on insertion of three data values into the containing web page as it is being served: a publisher ID and service endpoint URL, which are simply string constants provided to the web page publisher by the system, and a uniquely generated security token for each instance served.

The publisher ID and endpoint URL may be added to the header code once after provisioning by the system or may be added during token generation for improved modularity. Generation of the security token is an important step and is described in detail herein.

Security Tokens

In an embodiment, the service 101 uses JWTs, as described in detail in several IETF RFCs. In practice, a JWT is simply a string formatted in JSON notation. A "header" property describes some standard information about the token, while a "payload" property contains arbitrary data provided by the creator. Finally, a "signature" property contains an assertion that the payload was provided by the signer and a way to test if it has been tampered with. The signature is generated from a secure hash calculation over the payload data, using a hash algorithm such as HMAC or SHA-256. This string can then be encoded in Base64 notation and is easily transmitted as needed.

The service 101 relies on an implementation of JWT named "JWS", or signed tokens. JWS tokens are used extensively throughout the operation of the service 101. A JWS token is attached to every transaction with the service 101 that may be open to potential fraud. For HTTP GET operations, it is attached as a URL query property, while for others it may be included within the request or within HTTP headers.

Two different kinds of signed tokens are available: those with simple hashed signatures, which rely on a shared secret key, and cryptographic signatures, which rely on a cryptographic key pair, such as generated via the RSA or EC algorithms.

In an embodiment the service may use encrypted tokens, signified as "JWE" encrypted tokens. This protects the data in the token from exposure as it transits the Internet. Generating and handling JWE tokens is more complex, and usually only necessary if sensitive data of some kind must be encoded. Such tokens require the use of cryptographic key pairs for generation.

A publisher must use either a shared secret with the service or a cryptographic key pair for which the service has a copy of the public key to sign offers of inventory transmitted to the service. The service itself always uses a cryptographic key pair to sign all server-generated activity, maintaining the private key in secure storage.

Alternative embodiments may use other techniques for token generation. It should be appreciated that the use of "token" or "JWS" indicates any suitable way of generating an authenticating data item associated with network requests and responses in this system that provides equivalent functionality.

Ideally, a publisher 107a generates its own public/private key pair 116a, 116b, associated with its publisher ID and provides the public key 116b only to the service 101. Alternatively, the service 101 can generate a key pair for the publisher 107a on demand. The service 101 should not retain the private key that it generated. The publisher 107a is responsible for keeping the private key 116a secret and using it for signing and encryption of the security token.

Generating a token from a cryptographic key can be complex, although there are libraries for all popular programming languages that support the operation. Updating an existing website or application to properly generate the needed tokens may not be immediately practical for various reasons. In an embodiment, the service 101 can provide a shared secret key 301. In this case, the service 101 records the shared secret key in the corresponding publisher entity. Generation of a JWS from such a key is much simpler, but with a corresponding increase in risk of exposure of the secret and easier attacks on the tokens themselves. Note that as long as the secret key remains secret, an acceptable level of authentication is provided.

The service 101 can rely on publisher generated JWT tokens for several purposes:

A JWT signed by the publisher 107a ensures that the system only serves ads that have been negotiated with the publisher.

The token 118 identifies the user (at viewing application 103) as a customer of the publisher 107a. Each token has a limited lifespan to limit opportunities for fraud.

The token enables an audit trail uniquely identifying every inventory item offered by the publisher, which is used to quickly identify deliberate fraud or ill-behavior.

In an embodiment, the publisher may include additional information in the token, for example an anonymous identifier of the end user, or some publisher-specific tag to be included in reporting or auditing by the service. Such information is recorded into the recorded stream of ad serving activity.

Open-source JWT libraries exist for most languages popular for web serving, including .NET, Python, Node.js, Java, Javascript, Perl and Ruby. Token generation is then performed via a callout when generating the webpage at the server.

A test webserver demonstrates this technique and is discussed below.

2.1. Service Interaction
2.1.1. Data and API Model
2.1.1.1. Entities
Overview

Referring again to FIGS. 1a and 1b, in an embodiment, the service 101 has a simple data model and simple and consistent set of operations for manipulating it. The data model is formed around conceptual entities, and the algorithms provided to manage them. The data model may also be viewed as a graph, with entities as nodes. Entity instances refer to other instances using "entity references" (entityRefs); these may be viewed as edges in the graph. An entity may annotate each entityRef with additional data that is local to that instance. The services provided by the system are performed by traversing and updating the stored entity data. Each entity is precisely defined using a machine-readable schema defining the data types and allowable values for the entity.

In an embodiment, the service 101 may be comprised of a collection of software and/or databases running on one or more co-located or distributed servers that provide the functionality of the service 101. Entities are represented as database records which are accessed and manipulated by the service to provide the functionality described herein. Each entity represented in the databases is assigned a unique ID and may have arbitrary associated data. The unique ID allows for rapid lookup of entity data in the databases and is used exclusively by the service 101 in performing the activities described herein. The databases are optimized for rapid access and update when performing ad or asset serving functions.

The service 101 also provides a search facility for each entity type, as well as a global search across all entities within the system. Simple search queries are formed using, for example, the Elasticsearch "query string query" syntax, while the full power of the Elasticsearch Query DSL is available if needed. This view of the entities in the system allows for simplified construction of administrative, monitoring, reporting and auditing tools, which typically have lower performance demands than ad/asset serving.

In an embodiment, the service 101 exposes the operations for manipulating entities via a simple network API that is accessed by authorized client applications. A client must first authenticate that it is a valid user of the service. Once authenticated, the service enforces limits on the various actions that the user may perform on entities in the system. Authentication may be performed through any suitable mechanism for authenticating applications and users. In an embodiment, the service manages a small pool of authorized users using the AWS Cognito service. In another embodiment, an identity provider such as Facebook or Google might provide authentication. Authorization limits of each user are set by a service administrator.

A user may be authorized to perform some or all well-known CRUD (Create, Read, Update or Delete) operations on entities in the system. In an embodiment, operations are requested on entities using the standard HTTP protocol verbs PUT, GET, POST or DELETE applied to URL endpoints. PUT and POST operations include data specified in JSON notation for creating or updating entities; all operations return their results as data in JSON notation. The data that comprise each entity is described in JSON schema notation, and the data passed in or out of the service corresponds to the schema. The data passed to a POST operation to update an entity describes the desired changes to that entity; the service emulates those changes before committing them and will reject changes which violate the schema for that entity. Similarly, the data passed to the PUT operation must conform to the schema. The URL endpoints, for example "/district/{id}", identify the subject entity via its unique ID.

Searching for entities is provided via the search endpoint for an entity, for example "/district/search". The HTTP GET verb identifies a simple search in the query, while the HTTP POST verb specifies a complex query in the request body.

Alternate implementations exposing operations on entities are possible. In an embodiment, Graph Query Language (GraphQL) can be used over Websockets to implement the functionality described above. In such a case, changes to the underlying entities may be posted to the client application as they occur, unlike the HTTP API which requires that the client poll the service for changes.

Next are descriptions of the initial entities in the system. Other entities may be added as needed and accessed in the same way as described above.

Buyer: Service Customers

A buyer entity 102 represents an individual or company wishing to present advertising messages in the form of images or video to viewers thought to be interested in, or influenced by, the messages. A buyer entity 102 may include interesting data, such as names, addresses, billing arrangements, etc.

A buyer contracts with the system for asset/advertising placement services. Buyer instances describe any relevant information about the buyer and may contain entityRefs for active proposals and campaigns.

Publisher: Website Publishers Contracted with System

A publisher entity 107a-107c represents an individual or company that creates inventory 108 within an application 103 running on a client device that may be purchased by buyers to present their messages. A publisher might create a website with useful information 109, and the inventory provided might be specific image or video elements authored into the website into which a buyer's messages can be inserted by a browser application. A publisher might also be a smartphone application provider, again having authored specific inventory into its application that can be filled automatically. The publisher entity may include useful properties, such as names, location, type of viewers attracted to that publisher, types of inventory available, etc.

Each publisher entity 107a-107c describes the structure of inventory that may be provided by that publisher. For example, the application 103 may have different displayable sections, such as "sports" or "news", each having its own inventory with varying cost per content type. A publisher may provide the inventory structure for multiple applications easily through named sections. Sections are identified by the application 103 when requesting content to fill inventory 108.

A publisher has a number of different features that determine how assets/ads may be served to their webpages, for example Cost-per-thousand impressions (CPM). A publisher entity instance 107a-107c may include a public key for the publisher, assuming that the publisher keeps its private key. This private key is used to sign asset/ad fill requests to the service server 101, which then looks up the publisher and verifies the signature using the public key.

Other useful arbitrary data may also be associated with a publisher in a publisher entity 107a-107c.

District: Geographic Districts that May be Targeted

A district is any geographical entity which has a boundary. A district may be a political district, such as a congressional district, state assembly district, county or city. It may be a delivery district, such as a zip code. It may be service district, such as a water or server district. Districts are populated with a set of entityRefs of publishers that might address that district, and this set may be modified over time. In general, a district includes a link to the boundary definition of the district, usually suitable for use with mapping software, for example Google Maps.

A district may include additional information, typically used for selecting certain publishers to be included in a campaign 110. For example, the district may include references to the zip codes which are included in the district, or demographic information about residents in the district, such as party affiliations, population count, ethnicity, and so forth. Choosing the publishers to participate in a campaign using this information is called geotargeting.

The service server side may update derived data associated with a district, such as the boundary, publishers and zip codes, at any time.

Content: Images, Video, Etc., to be Displayed by a Publisher

Content entities 104 represent the images, video or other media types or assets that have been created in order to deliver the buyer's messages. A buyer 102 uploads this content 105 to the service 101, where it can then be provided by the service servers to viewers on demand. Each content entity 104 can contain at least one label 113 association for it to be served into inventory 108. The content entity 104 may include a number of properties, such as names, content parameters, etc. Said information is used when the service selects placements for inventory offered by publishers. For example, an avail may specify allowable image dimensions.

In an embodiment, a content item is built of a number of components:
 A content file that may be served; it is uploaded for serving.
 The content entity instance, which points at the content file.
 A set of HTML class names that can be served by this content item.
 A set of Labels that are attached to this content item.

The content manager oversees the loading of content for later ad serving, recording secure ad impressions, and rendering flight information into the action table 311 (described below). An impression 106 is the delivery of a single content item into an available inventory slot in inventory 108 that is presented to a viewer 111. The content item delivered often includes a way to interact with the buyer's message by clicking or touching the content displayed, which redirects the application to an "Click Response" agent 125 which provides a presentation specific to the item 112. This interaction is typically called a "click-through" 112 and has higher value to a buyer than an impression.

Label: Tags Matching Content and Campaigns

A label entity 113 represents an association between entities. It may have additional properties, such as a friendly name and description of its use.

Each label entity 113 is simply an arbitrary tag name, along with descriptive information. Labels provide an additional level of indirection between campaigns 110 and content 104. At the most basic level, a single label can be used per campaign 110, with all content involved also tagged with that label. Using multiple labels allows reusing of content, rotating its usage, or other actions.

In an embodiment, the label may include one or more priority values, indicating how content so labeled should be prioritized during targeting of placements.

Campaign: Everything Needed to Manage a Campaign

Figure 3:
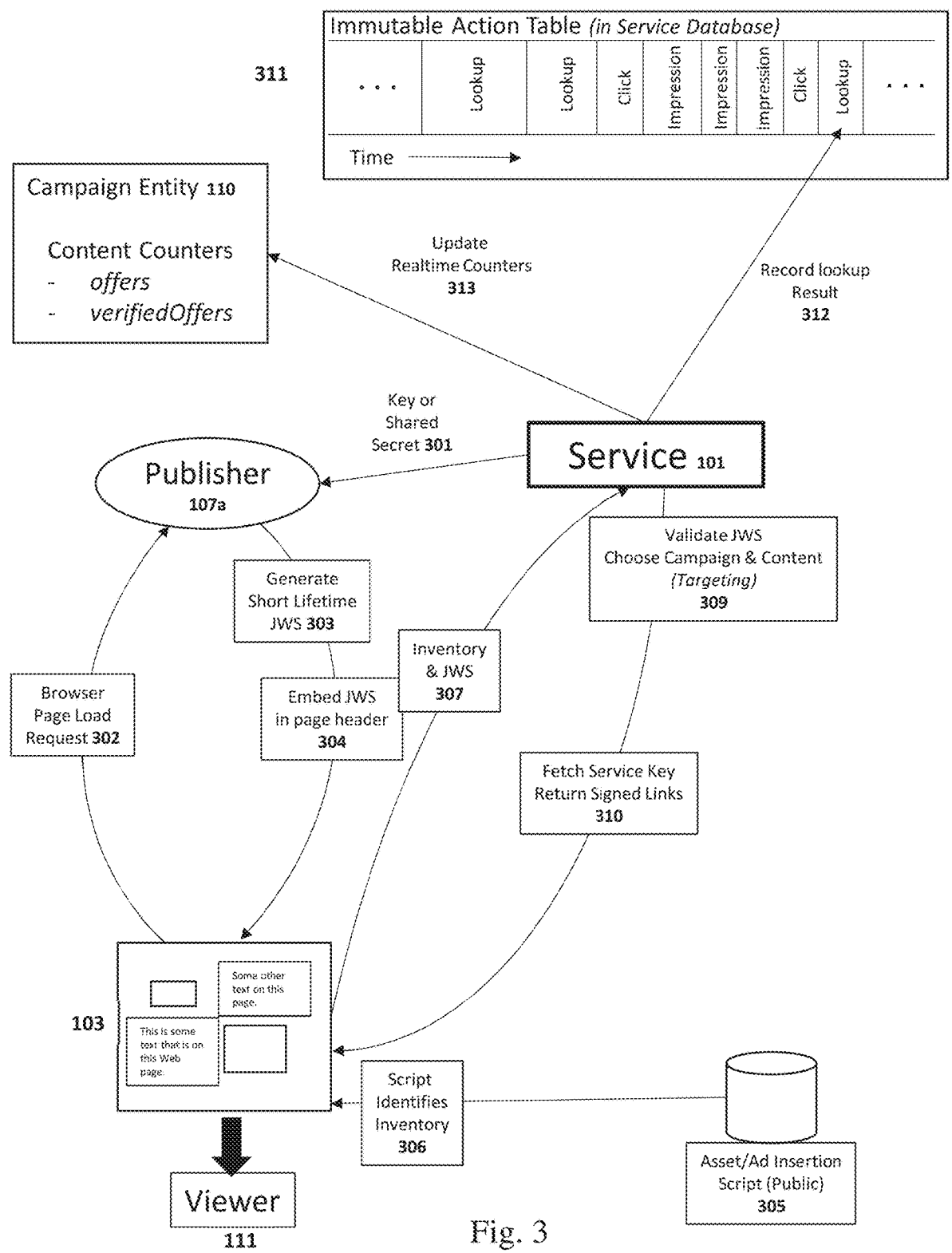
FIG. 3 is a block diagram of loading assets at a publisher website according to an embodiment of the invention.

Referring to FIGS. 1a, 1b, and 3, a campaign entity 110 represents an agreement between a buyer and the service about how the buyer's content entity should be presented to viewers. A campaign entity 110 does not list the content entity items that are part of the campaign. Instead, it contains one or more label associations. The service 101 chooses content 104 to fill inventory 108 by matching the label associations in the campaign 110 with labeled content entities 104. This level of indirection makes it convenient to add, remove or modify content entities for a campaign as desired, as well as to reuse content entity items. The publishers 107a-107c that a buyer 102 believes will attract desirable viewers are listed, along with the desired number of impressions of the various content entity types, the price that the buyer will pay for each impression, and so forth.

In operation, the service 101 accepts notifications of available inventory, selects one or more content entities 104 to fill that inventory 108 based on the campaigns that are active, and maintains a record of that activity. When the campaign goals are fulfilled or the campaign expires, the service 101 uses this activity record to bill the buyer and disperses funds to the publishers for their filled inventory. The difference between these values is the gross profit (or loss) to the service.

A campaign 110 is composed of:
  A set of publishers (typically derived from the district(s) being targeted.)
    Each publisher having a list of sections for which the service should offer placements,
    For each section, a list of the expected avails to be offered, i.e., content type, size, etc.,
    A number of times that buyer wishes a placement to be made for each of the expected avails,
    The Cost-per-Thousand (CPM) of placements to be paid by the buyer, or a simple flat-rate value to be paid by the buyer.
  A set of labels which match content items to this campaign.
  A start and stop date, which describe a window of time in which the Campaign is active and may be targeted. Inactive Campaigns are ignored during targeting.

The campaign manager records all asset/ad serving activity into the action table 311.

The campaign may be modified through the API while it is active, for instance, to add or remove publishers, change start or end dates, etc. Changes to ads/assets to be delivered are made simply by changing the labels referred to by the Campaign.

In an embodiment, the campaign entity also includes, for each candidate publisher, a set of counters that track activity of the service 101 for that campaign in real time. Separate counters are maintained for each inventory section and targeted content type. These may be polled by a monitoring application in order to view the progress of a campaign as it occurs, or to detect unwanted conditions. Use of these counters is described herein.

In an embodiment, the Campaign entity may be accessed via commands on a Websocket connection, for example via GraphQL (described previously). The client "subscribes" to the Campaign entity, indicating that it wishes to be notified of changes to the Campaign, in particular, changes to the campaign counters. As the counters are updated, the service "publishes" these changes to the client. The client can then update its display of the Campaign information in real time as activity progresses.

Proposal: Template for a Campaign

In an embodiment, a campaign 110 is created through a negotiation between a buyer and representatives of the service. The initial structure of the campaign, the amount to be paid for each delivered impression or click-through, the types of content entity involved, and other parameters are recorded by the service as a Proposal entity. Summaries of a working proposal can be generated from a Proposal as needed by the service, typically as a spreadsheet.

Once a proposal has been agreed to by both parties, the service 101 uses it to generate a campaign entity 110, which includes all the rules for how the content entity will be served and tracked by the service 101. A campaign is thus a concrete specification of how the service 101 will satisfy the agreed proposal. Information in the Proposal is copied to a Campaign and the new Campaign is independent of the source Proposal and may be modified if needed. In addition, a Proposal may be used to generate multiple Campaigns, often with minor changes or variations.

2.1.1.2. Other Models

The Journal

The Journal (not shown) is simply an immutable record of all changes to entities within the system. This includes creation, deletion and modifications to entities. There are two primary uses for the Journal: 1) to provide for undoing unwanted modifications or deletions, and 2) to provide a permanent record of entity state for auditing of the Action Table (see below).

The Action Table

The action table 311 may be thought of as an infinitely long record of all asset/ad serving activity by the service server 101. It may be queried as desired, usually using a window of time. Actions are recorded with the publisher that caused the action and the campaign for which the action was taken. Thus, the action table 311 may be quickly queried for dashboard-like presentations. Alternatively, the Action Table is also searchable, as described previously for entities. Activity is reported for asset/ad placement, impressions and click-through requests in near real time. As previously noted, entities in the system are uniquely identified, and those identifiers are recorded in the Action Table along with related events. Combined with the Journal, this allows all entries in the table to be audited, and those entries to be traced back to the involved entities, even if those entities have since been removed from the rest of the system.

In an embodiment, the Action Table may be accessed via commands on a Websocket connection, for example via GraphQL (described previously). The client "subscribes" to the Action Table, indicating that it wishes to be notified of new records as they are added. As records are added, the service "publishes" these changes to the client. The client can then update its display of the ad/asset serving activity in real time.

In an embodiment, the action table 311 is written using cryptographic blockchain techniques in order to avoid tampering, either by trusted employees or external actors somehow gaining access to the action table 311. For some applications, this may not be necessary if the table is sufficiently secured.

Users and Authorization

In an embodiment, a user record must be created on the server 101 to manage authorization for authenticated users of the service; without such a record authenticated users will be unable to access the service. Authorization happens at two levels.

First, a number of groups may be configured by a service administrator that allow combined sets of permissions to read, create, modify and delete entities. Users are then associated with zero or more of these groups. For example, a group named "sales" might have permission to create Buyers and Campaigns, read Districts and Publishers, and read the Action table. Groups are generally intended for internal use by system employees or contractors.

Second, a user may be associated with one or more accounts. An account is an arbitrary string. A user has a current account, which is associated with any entities he creates. Regardless of group affiliation, a user may access an entity if its creation account is listed in the user accounts. Accounts are primarily targeted at external users, for example, for viewing dashboard information.

2.1.2 Campaign Targeting

Targeting describes how the service 101 decides where it is appropriate to place assets/ads to satisfy the campaign. Some automated ad targeting systems depend on identifying, to some level of certainty, the type or even identity of the viewer of the advertising. Identifying the viewer is problematic. Some systems rely on IP addresses, which are seldom sufficient for the purpose due to the manner in which the Internet operates. Others depend on external data, such as browser cookies or data purchased from consumer research firms, which is then used to "identify" the viewer in some degree. There is increasing concern among consumers about the manner in which such data is collected and used. This has resulted in initiatives similar to the General Data Protection Regulation (GDPR) in Europe, which specifies how such data may be used.

Although techniques relying on identifying particular viewers may be used for targeting in the system described herein, an embodiment uses publisher targeting. This form of targeting assumes that the service 101 has a great deal of information about the publisher of a website or mobile application, and that any given publisher addresses one or more useful groupings of potential viewers.

Publisher information is usually public and can come in many forms. For instance, a publisher may be a local television affiliate, providing local news through a website or mobile application. It can then be assumed that this publisher is useful in targeting viewers in a particular demographic, e.g., the geography in which the television affiliate broadcasts its programming, etc.

Such targeting is of particular interest in political advertising, as geography is the key determinant of how political officials are elected. In the United States, for example, electoral entities include Congressional districts, state legislative districts and offices, county or city offices, and local service districts (e.g., water, sewer, etc.). In some cases, the geographic entities may be areas sharing the same zip code. Publishers may also address specific groupings, such as religious affiliation, hobbyists of various kinds, etc.

In an embodiment, during the proposal phase, the buyer and service negotiators identify publishers which will attract viewers of interest to the buyer and adds them to the proposal. As part of this process, the buyer specifies what inventory is of interest and how much of it to buy, the content entity to fill it, and the distribution of the content entity between the publishers. Thus, targeting of publishers is performed a priori. Conversion of the final proposal into a campaign is straightforward and the campaign is a machine executable specification for the service 101 to use in satisfying asset/ad serving requests. Once created, a campaign may be altered as needed by agreement with the buyer, allowing adaptation to changing circumstances.

Because the application 103 running on a client device is not under the control of the service 101, and a publisher is generally not required to give assertions about how inventory 108 is filled, there are many opportunities for cheating or manipulating the operation of the service 101 for gain. This problem is particularly acute for Web browser applications, which by their nature are open to various kinds of attacks.

For example, a program may be written that behaves like a viewer 111, receiving impressions and clicking on them, without any real person being present. Such programs operate many times faster than human beings and can provide the illusion to the service 101 that real people are viewing the content.

Some campaigns involve politically motivated assets/advertising, in which case the goal of the assets/advertising is manipulating the viewer in some way and the asset/ad content is often rigorously regulated. This means that the buyer must be vetted in some fashion, the content must meet various standards for speech or accuracy, and a complete audit trail of serving activity maintained.

It is a goal of the service 101 to address both these classes of problems in online targeting of assets/advertising serving during a campaign. There are multiple strategies required to achieve this goal.

Figure 2:
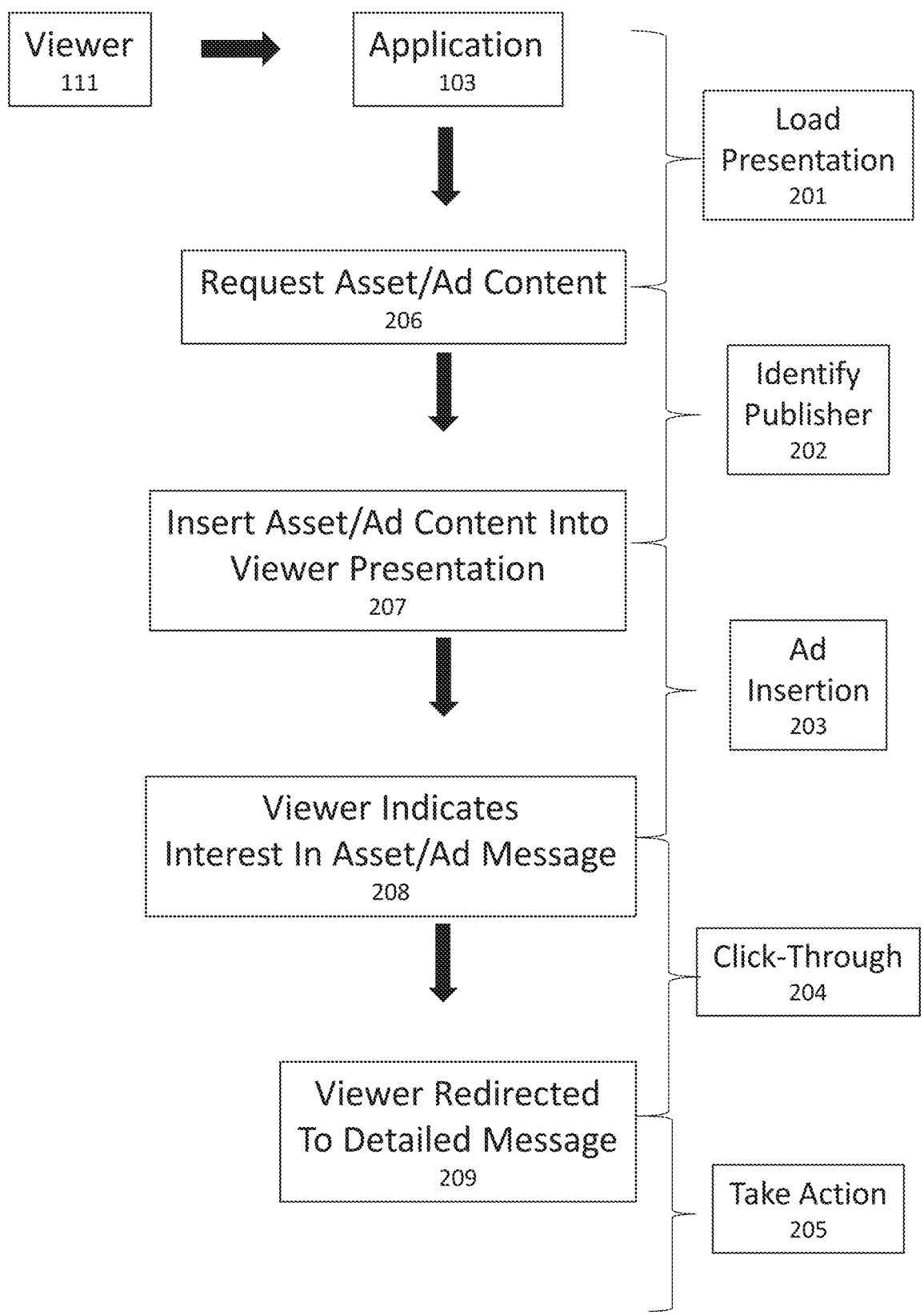
FIG. 2 illustrates a flow chart of asset serving process according to an embodiment of the invention.

Referring to FIG. 2, an illustration of the steps involved in serving advertising is shown. In the first step 201, the application 103, running on a client device, loads the presentation 201 for the viewer 111, for example, loading a website via a URL. This presentation has specific affordances for advertising content, for example, an HTML image tag of a particular size, or, in a mobile application, a specific step in the presentation sequence where a video might be played. The service 101 has no control of this presentation.

In an embodiment, the header script inserted into the delivered publisher Web page makes an HTTP POST request to the URL endpoint "/lookup". The script includes as JSON formatted data a summary of the available inventory, which includes at least the type of avail (video, audio, image, etc.), the size on the page of the avail, the section name (if provided by the publisher), the publisher ID and the signed token identifying the publisher. The service then performs ad placement for any offered avails, returning the result as JSON formatted data, which the header script processes to update the viewer presentation. For example, the service 101 may provide a URL to an image to be loaded into an available HTML image element, and a URL for redirection if the user clicks on the element.

The service 101 begins placement by authenticating the publisher of the application 202. This is necessary to ensure that the publisher is known to the service 101 and should be trusted. Establishing this trust is necessary to ensure that the campaign is properly presented to the viewer 111 and tracked. In general, the service will not respond to offers from unknown publishers, however in some embodiments the service will log the attempts for later auditing.

In an embodiment, if the publisher is known, but the provided token is invalid, the service marks the request as submitted with an invalid token, and the reason for its invalidity, and continues with targeting. In other embodiments, the service may simply ignore an improperly signed request. Continuing with an invalid token is appropriate in some circumstances; for instance, the publisher did not present a properly generated token, or the token is expired by the time it was presented, or perhaps the publisher neglected to update its software after updating to a new key. Continuing provides the opportunity to log the activity in the Action Table for later auditing and reporting but flags problems with the publisher setup.

In an embodiment, the server assigns this particular inventory offer a unique identifier, which is included in all records written to the Action Table for this offer. This allows tracking each inventory offer individually as the targeting proceeds, for later reporting and auditing. The server writes an entry in the Action Table indicating the publisher ID, token validity, and the offered inventory.

In an embodiment, if an expired token is presented, it may indicate that a replay attack is underway, whence a malicious actor extracted the signed token from the publisher page and reuses it in an attempt to inflate impression counts. The service may choose to track use of expired tokens in the Action Table in order to identify such attempts.

In an embodiment, the service than collects all active campaigns which include the given publisher. If no such campaigns are found, the offer is refused. Otherwise, the identifiers of the collected campaigns are written to the Action Table.

In an embodiment, the service then collects all content which is labeled in any of said campaigns and is marked as being suitable for the offered avail based on section name, avail type and avail size. At the end of this step, the service has a list of campaigns with content items suitable for the offered avails. In an embodiment, the server logs the identifiers of the items in this collection to the Action Table.

In an embodiment, if more than one content item is available to fill an offered avail, the service chooses to fill it from the campaign with the least number of impressions for that avail so far. In another embodiment, the service chooses randomly among the available items for placement. In another embodiment, the content labeled with the highest priority label may be chosen. In another embodiment, the content having the greatest CPM value to the service may be chosen.

In an embodiment, if the service finds fewer placements than offered inventory, the service fills the remaining placements with already placed items. In another embodiment, the service simply declines to fill offered inventory that has no unique placement available.

Once all placements are decided, the server generates authenticating JWT tokens using its own keypair to enable fraud detection as follows:

a. For content URLs, the server signs a token including the unique ID of the content, the unique ID of the campaign from which it came, the unique ID of the publisher offering the inventory, and identifying information for the particular publisher avail that was filled. This token is then attached to the URL as a query string parameter.

b. For click-through URLs, the server signs a token including similar information to the above and attaches it to the URL as a query string parameter.

Finally, the service responds to the offer with a summary of the content to be placed in each of the offered avails by the requesting script and records the final placement in the Action Table. The actions taken by the client after receiving this response are described below.

2.1.3 Fraud Detection

Fraud detection is based on analyzing the data stored in the Action Table, which is a complete, time-based sequence of all the ad serving activity of the service. The previous section described the information each portion of this activity records in the table.

In an embodiment, segments of the Action Table are read at regular intervals and the records in that time segment are processed as a batch. For example, a job might run every day at midnight, whence it reads all the records for the previous 24 hours. This job would then generate a summary report flagging suspect activity and save the report or send it to an analyst via email for examination.

In another embodiment, a server process runs continuously, receiving a copy of each record as it is written, processing the records in real-time. This continuous process recognizes suspect activity as it happens and might alert an analyst via email or text message.

The first step of fraud detection touched on briefly above: validating the publisher. There may be a large number of invalidity records found in the Action Table for a particular publisher. This might indication misconfiguration on the publisher's part, or it might indicate malicious activity. For example, re-use of an expired token may indicate that the token was scraped from the publisher page and used in a replay attack. Based on business policy, it may indicate that the publisher should not be paid for invalid requests.

Figure 4:
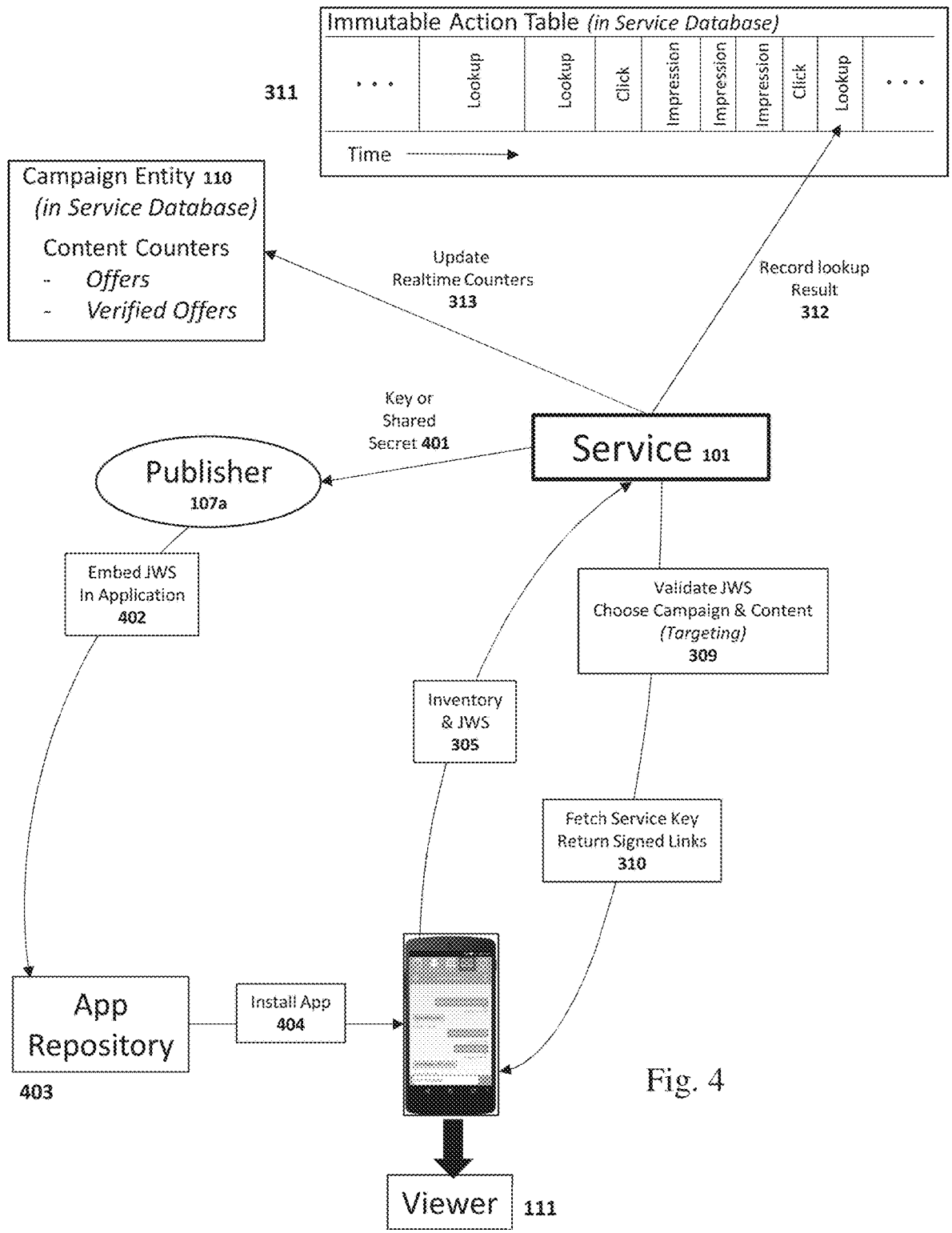
FIG. 4 is a block diagram of loading assets at a publisher application according to an embodiment of the invention.

FIG. 3 illustrates the operation of steps 202 and 203 in the case of a website presented through a browser application 103 while FIG. 4 illustrates these steps for a mobile application.

Figure 5:
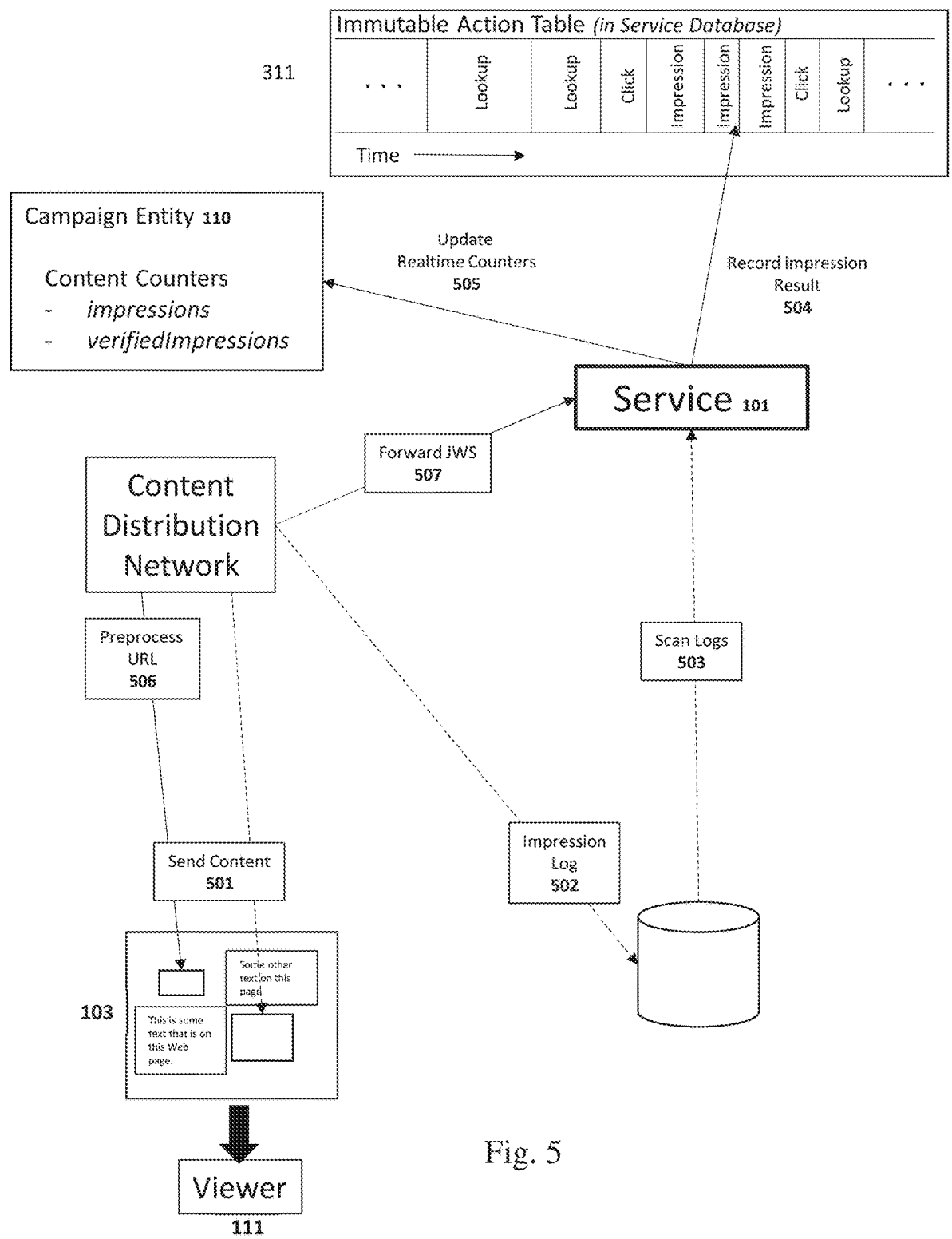
FIG. 5 is a block diagram of an impression tracking feature according to an embodiment of the invention.

Referring to FIGS. 2 and 5, the provided placement information is then loaded into the presentation by the application 203. It is important to ensure that the desired content is actually loaded and presented to the viewer. For instance, the requesting application might simply ignore the directive, causing the service 101 to assume that a person actually viewed the content, when he had not, thus defrauding the buyer. This is detected by noting that a placement 310 was provided by the service, but no matching record 502 or 503 was ever created by actually loading the content into a browser window. Normally, content should be loaded very quickly once inserted into the presentation 103. Based on the business policy, it may indicate that the publisher should not be paid for undelivered impressions.

During processing it may be noted that multiple loads of the same URL 501 are occurring rapidly, uncorrelated with matching final placement records. This indicates some form of economic attack (driving up serving costs with no corresponding revenue) or some form of Denial-Of-Service attack. Based on business policy, the service may wish to work with a DNS provider to block requests from that address.

Figure 6:
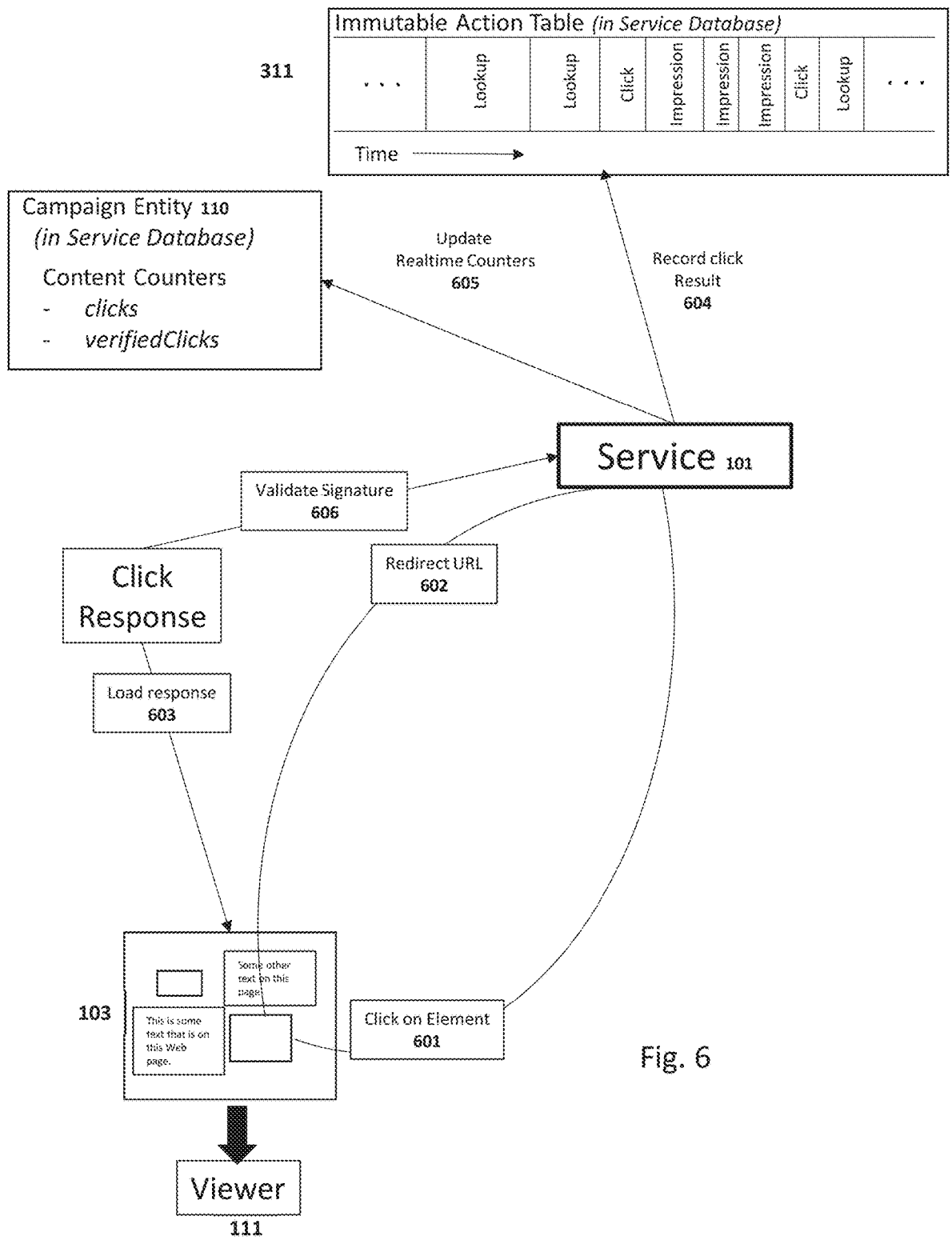
FIG. 6 is a block diagram of tracking click-throughs according to an embodiment of the invention.

Referring to FIG. 6, a viewer sufficiently intrigued by the placed content might choose to take action 601, e.g., by clicking on the message to receive more information 603. For example, a website would respond to the click by loading a presentation from a URL 601 provided by the service 101. The service 101 receives the indication that the user clicked on the placement and records that the click occurred after validating the token attached to the URL. The service 101, redirects the application 602 to the appropriate response as directed by the buyer, attaching a newly generated token. Redirecting the click-through from the service has several advantages: it allows the service to record that it occurred, it allows verification that the URL has not been tampered with and it allows the destination URL to be changed dynamically.

The click response server may validate that the redirection was properly performed by capturing the service signed token from the redirection 602 and directly contacting the service 101 to request validation of the token. The service 101 records this request and the result of validation as well. Invalid signatures indicate that the click-through did not come from a viewer of the desired placement but might instead be an attempt to drive up cost or a DoS attack. Invalid click-through attempts should not be paid for by the buyer.

The service 101 enables this identification by including a signed token with all directives it provides, and as described earlier requires publishers to provide a proper signature along with inventory offers. By analyzing these tokens, the service 101 can authenticate publishers and itself provide authentication for impressions and click-throughs, and generate precise records of activity for real time or batch reporting and auditing.

2.1.2.1. Workflow Examples
Example Campaign Workflow
Creating a Campaign

A service (system) salesperson ensures that a buyer is created representing the customer.

The salesperson creates one or more proposals for the buyer and iterates with the buyer until a satisfactory proposal is established, including content.
  a. Using districts as an aid, the salesperson may propose a slate of publishers that meet the buyer's needs.
  b. Establish starting and ending dates, target impressions, and so forth.
  c. Load content items.

On proposal acceptance, a new campaign is created from the proposal, and the campaign becomes active.

As the campaign runs, the buyer or salesperson may monitor campaign progress via a dashboard UI displayed by the service servers 101 pulling data in real-time from the action table 311.

Examples of Asset/Ad Serving Workflow

Referring again to FIG. 3, a publisher 107a provides a website. The user/viewer 111 clicks on a link taking the viewer to this website. The first step in delivering the website is a page load request 302. To satisfy this request, the publisher's server must generate a unique JWS 303 using the secret key 301 and embed it in the page to be loaded 304. The JWS should have a short expiration time. The JWS itself is viewable as the page is loaded thus it can be easily extracted by any number of tools. This makes the service 101 susceptible to replay attacks, i.e., re-using same token to validate the page load. The attack surface is greatly reduced by a short expiration time.

In an embodiment, a publisher may not need to embed the token as the page is generated by his server. Some Content Distribution Networks (CDNs) such as AWS Cloudfront support running small snippets of publisher-provided code as part of the loading process. Such a code snippet might be executed on every page load, and it could generate the token and attach it to the response, for instance, as an HTTP header. The header script would recognize this condition, fetch the token from the appropriate header, and include it in the inventory offer to the service.

In an embodiment, in some cases, the actual index page or container page for ad avails is cached, which makes it impossible to dynamically insert a token on each refresh. In these cases, the expiration time on the token can be made much longer, preferably to about the same time between expected refreshes of the cached page. A long expiration obviously increases the opportunity for bad actors to use the token for their own purposes. A token with no expiration is the worst example of this.

Even in this case, if misuse of long-lived tokens is detected, all tokens can be invalidated by simply generating a new key pair, providing the new public key to the system, and regenerating the containing pages with some cache-busting strategy.

Preferably, the publisher should explicitly mark container pages as uncacheable, ensuring the token is uniquely regenerated every fetch. This can be done in any of: via HTTP headers, by inserting the proper meta tag in the page, etc.

When the page loads, the page header in turn loads the system asset/ad insertion script 305. In an embodiment, the script is simple, written in plain Javascript for speed, and publicly viewable for examination and assurance of correct operation. The script assumes that all inventory on the page which is a candidate for service asset/ad insertion has a specific class tag. It collects the inventory information 306, as well as the JWS embedded in the page, and forwards that data to the service 307 as an inventory offer.

The service 101 locates the publisher entity and fetches the public key or shared secret, and proceeds to validate the JWS 309. In an embodiment, if the token is not valid, the service will not offer any placements. In an embodiment, if the token is not valid, the service continues with placement generation, recording the invalid token presentment for later analysis. The service 101 then finds all campaigns 110 that refer to the given publisher 107a, and from those campaigns 110, chooses one or more content entities that fit the declared inventory. If one or more inventory items cannot be filled with a content entity from an active campaign 110, the service 101 indicates such. The website is free to fill that inventory from other sources, or to simply remove it from the presentation.

The service 101 maintains its own cryptographic keypair, which it uses to generate a unique JWS for each and every link to content that it provides 310. This JWS is provided as a URL query parameter on the final link and is thus compatible with all browsers. The purpose and usage of the JWS tokens is described below. Finally, the ad insertion script 306 writes the provided links into the HTML of the page, whence the browser loads the content for the viewer 111.

As described previously, all asset/ad serving actions by the service 101 are recorded in a database called the Action Table 311. In an embodiment, three important properties of action table 311 are: 1) once a record is written to the table, it is never changed, 2) records are written in strict time ordering, and 3) it can grow arbitrarily long.

In an embodiment, the action table 311 is written using cryptographic blockchain techniques in order to avoid tampering, either by trusted employees or external actors somehow gaining access to the action table 311. For some applications, this may not be necessary if the table is sufficiently secured.

Various entries to the action table 311 are detailed as needed in the descriptions to follow. Here, we are interested in the lookup action, whereby the service 101 handles a request for content to fill inventory.

In the final steps after returning directives on filling the inventory, the service 101 writes an entry to the action table 101 describing exactly what campaigns and content entity it found, the validity of the publisher JWS, and possibly other relevant service data 312. Lastly, it updates a pair of counters 313 that are maintained as part of the campaign entity 110 for each inventory section and content type provided by the publisher 107a. In an embodiment, for every inventory item to be filled, it will add 1 to the offers counter, indicating that it received an inventory offer, and if the publisher JWS is valid, it adds 1 to the verifiedOffers counter. Ideally, these two counters always have the same value (indicating that all inventory offers were properly signed by the publisher). These counters may be read out from the service 101 by various applications, including those providing real time monitoring of asset/ad serving. If the counters differ, it indicates a problem with one or more publisher sites or perhaps malicious activity. A full audit of the action table 311 can further identify potential problems.

FIG. 4 illustrates an overview of a mobile application that provides asset/ad inventory. The basic difference from the workflow above is how the application is created and provided to the viewer.

A mobile application is usually constructed and tested offline, and then packaged and cryptographically signed for distribution through an application repository 403. During packaging of the application, the publisher must generate a JWS using the secret key 401 and add it to the package 402. In this case, the JWS may have a long expiration (or possibly no expiration), as it is assumed the application delivery and installation process 404 is secure and will never expose the JWS outside the application.

When the application presents inventory for advertising, it forwards the inventory and JWS to the service 101 as described previously. Subsequent steps occur in the same manner as described above.

2.1.3. Tracking Impressions

As previously described, an impression is a specific instance of loading a content entity item into the presentation to the viewer 106. When satisfying an inventory offer, the service 101 provides URLs to the content entity to be served. Each URL is decorated with a JWS signed by the service 101 with its own private key. In this case, the JWS includes the unique IDs for the publisher that made the offer, the campaign from which the content was taken, and the content entity.

Referring to FIG. 5, as part of asset/ad insertion 203, in an embodiment the content indicated by the URL is hosted on a Content Distribution Network (CDN) for performance reasons. In other embodiments the content may be hosted on one or more individual servers. When the content is loaded from a CDN 501, the CDN recovers the JWS included on the URL, and forwards it to the service 101.

Alternatively, the JWS may be logged for later processing. This typically means writing a log entry or log file to a secure location accessible to the service 502. The log entry will have at least the JWS and may also include such information as the requesting IP address or other interesting information. At some acceptable frequency, the service 101 polls the log entries, and processes each to recover the JWS and other interesting information 503.

For each entry, the service 101 uses its public key to validate the JWS. It then packages the impression information into an impression record and writes it to the action table 504. Finally, it updates the counters in the campaign entity 110 to reflect the impression 505. In an embodiment, the impressions counter is incremented by 1 for each impression logged. The verifiedImpressions counter is incremented by 1 for each validated JWS found in a logged impression. Ideally, the two counters are always equal. Should the verifiedImpressions counter fall below the impressions counter, it indicates potential fraud. In such a case, the action table 311 may be audited to obtain additional information that may lead to the source of the fraud.

Logging from a CDN for impression tracking is not usually desirable. Each signed JWS attached to a URL from an application can result in bypassing the caching behavior of the CDN, as it will differ from all other URLs seen, even for the same content.

In an embodiment, the CDN is configured to pre-process the URL 506. For example, if the CDN is the Amazon Web Services (AWS) product CloudFront, the URL to be loaded is first presented to a small code fragment provided by the service 101. This code fragment strips the JWS from the URL and normalizes it, providing optimal cache behavior, and forwards this new URL to the CDN for loading.

This code fragment then sends the JWS and any other interesting information from the impression to the service 101 directly for processing 507, whence it is handled in the same way as a log entry, as described above, except that the processing occurs in near real time.

2.1.4. Tracking Click-Throughs

FIG. 6 illustrates an overview of the click-through action 204. When the service 101 returns a content URL to fill offered inventory 307, it may also provide a click-through URL, if specified by the buyer. For instance, if the inventory is part of a website, the asset/ad insertion script 305 wraps the content element with an anchor element, setting its URL to that directed by the service 101.

The URL provided by the service 101 does not directly point to the buyer's preferred location. Instead, it points to the click entry point on the service 101 and contains an attached JWS previously signed by the service 101 with its private key. This JWS indicates the publisher providing the inventory, the campaign that filled it, and the content entity that was served.

Should the viewer 111 choose to click on/select this element 601, the service 101 recovers the JWS and validates it. It then fetches the appropriate click-through URL as provided by the buyer from its database. The service 101 then generates an authenticating JWS and attaches it to the click-through URL and sends a redirect instruction back to the application 103 providing the URL 602. Should no JWS be attached to the click request, the request is discarded and the application 103 informed of the invalid URL.

After redirecting the application 103 to the proscribed URL, the service 101 adds a click entry to the action table 311 describing the request 604. Finally, the service 101 updates a pair of counters in the campaign entity 605; the clicks counter is incremented by 1, and if the JWS was validated, the verifiedClicks counter is incremented by 1. These counters are expected to be equal in normal operation; if clicks exceed verifiedClicks it indicates potential fraud, and the action table 311 can be audited to further research the cause.

The buyer server providing the click response may wish to validate that the click-through URL was properly validated and passed on by the service 101. To this end, it extracts the JWS token that the service 101 attached to the URL and makes a separate request to the service 101 for validation 606. The service 101 uses its own public key to validate whether it indeed generated the JWS token and returns the result. This provides a final guard against fraud should the buyer require it.

2.2. Test Webserver Example

Figure 7:
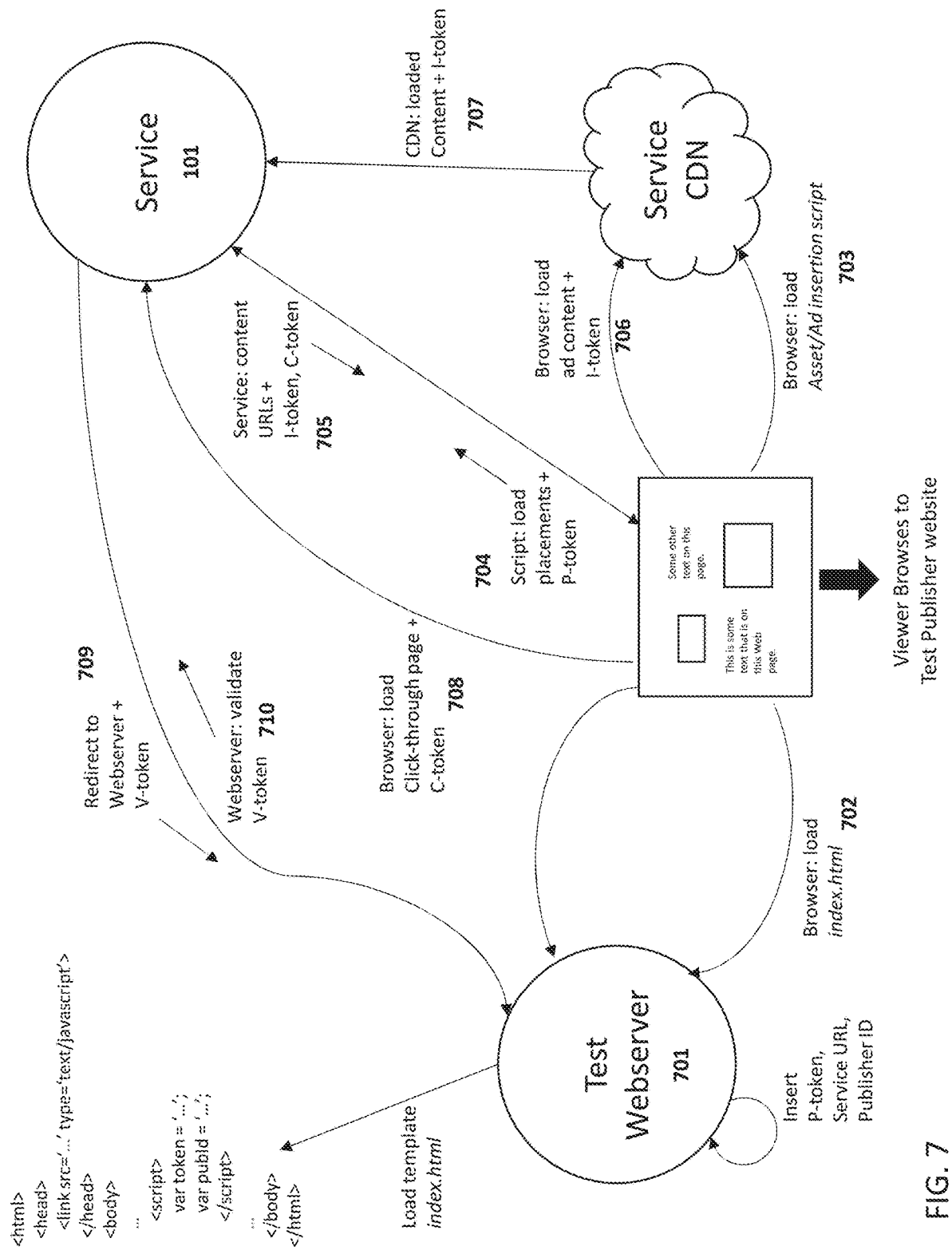
FIG. 7 is a block diagram of the operation of a test webserver which may be used in testing and development of a publisher website or in testing the backend service.

Referring to FIG. 7, in an embodiment, the test webserver is useful as a demonstration and reference implementation of a functioning publisher website.

The test webserver 701 is part of a development package available to publishers demonstrating ways in which the service may be supported by the publisher web-serving setup. Full source code of the test webserver is provided. Using environment variables, the publisher ID, publisher secret key, and service 101 URL are provided to the server. The server may be run standalone or under control of a local Web Development environment for testing and debugging.

In an embodiment, the test webserver is preconfigured with a test publisher ID, secret key and service URL which are valid for the production service. In addition, the service has been configured with an active Campaign including the configured publisher ID and Content items to be provided under that Campaign.

The test webserver ensures that no caching of the index page is performed. Many browsers will cache the index page by default, which suppresses generation of a new publisher token on every page load. It does this by setting the following headers on the page load response:

Cache-Control: no-cache, no-store, must-revalidate
Pragma: no-cache
Expires: 0

The test webserver is contacted using a browser, by entering the local URL of the index page provided by the test webserver 702. The server then loads a template of the initial webpage from disk. Using the given publisher ID and secret key, it generates the publisher token, labelled P-token in the figure. The publisher ID, P-token and service URL are then inserted into the template, which is then delivered to the browser as the page to load. The initial template includes a directive which will cause the browser to load and run the asset/ad insertion script 703. This template also includes various service-tagged avails for both images of various sizes and videos.

The asset/ad insertion script scans the newly loaded page, finding the service-tagged avails. It composes information about the avails along with the publisher ID and P-token into a POST request to the server, offering the avails as inventory 704.

The service decodes the token, finds the publisher and configured Campaign, identifies Content for the offered inventory, and constructs a response to the asset/ad insertion script. Each offered Content URL is tagged with a new service-signed token. In addition, if any avail indicates that it has a click-through action, the service provides a URL for it, tagged with a new service-signed token. The service then sends the response back to the asset/ad insertion script 705.

The asset/ad insertion script then updates the page in the browser, inserting the corresponding URLs into the service-tagged HTML elements. This causes the browser to automatically load the referenced content 706. Additionally, if an avail includes a click-through URL, the script wraps the content with an anchor element pointing at that URL.

As each content URL is loaded from the service CDN, the I-token attached to each is removed and forwarded to the service for processing 707.

At some point, the viewer may decide to click on one of the content items provided. If a click-through URL was provided, the browser attempts to load that URL 708. The service extracts the C-token from the request and verifies that it is the same one it signed when responding with placements 705. It then sends a redirect 709 to the browser with a URL for the test webserver, signed with a new validation token, called the V-token. The test webserver loads a confirmation page for the browser after submitting the V-token to the server and requesting validation 710. The service logs this validation request to the Action Table 311.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

3.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

FIG. 8 is a block diagram that illustrates a computer system 800 utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device.

Computer system 800 includes one or more busses 802 or other communication mechanism for communicating information, and one or more hardware processors 804 coupled with busses 802 for processing information. Hardware processors 804 may be, for example, a general-purpose microprocessor. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes a main memory 806, such as a random access memory (RAM) or other dynamic or volatile storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, is provided and coupled to bus 802 for storing information and instructions.

Computer system 800 may be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

In an embodiment, output to display 812 may be accelerated by one or more graphics processing unit (GPUs) in computer system 800. A GPU may be, for example, a highly parallelized, multi-core floating point processing unit highly optimized to perform computing operations related to the display of graphics data, 3D data, and/or multimedia. In addition to computing image and/or video data directly for output to display 812, a GPU may also be used to render imagery or other video data off-screen, and read that data back into a program for off-screen image processing with very high performance. Various other computing tasks may be off-loaded from the processor 804 to the GPU.

One or more input devices 814 are coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

A computer system 800 may implement techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data, including program code and/or other types of instructions, through the network(s), network link 820, and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

In an embodiment, some or all of the systems described herein may be or comprise server computer systems, including one or more computer systems 800 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

4.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for tracking the display of online content assets, comprising:
   receiving, by a server, a request for online content assets from an application program executing on a client device, the request including an application program publisher token;
   authenticating, by the server, a publisher of the application program by:
      decoding the application program publisher token using a shared secret key; and
      determining whether the application program publisher token has expired;
   upon a successful authentication of the publisher:
      directing the application program to one or more online content asset URLs, each URL containing a server token, the application program displays information associated with the one or more online content assets to a user;
      recording that the one or more content asset URLs have been sent to the client device;
      receiving, by the server, an indication from the application program that the user has selected a displayed online content asset of the one or more displayed online content assets, the indication including an associated server token for the selected displayed online content asset;
      recording, by the server, the selection of the displayed online content asset; and based on a determination that the associated server token is valid, directing, by the server, the application program to a URL for an online content asset associated with the selected displayed online content asset, the URL containing a second server token; and
upon an unsuccessful authentication of the publisher:
recording, by the server, an invalid request from the application program; and
tracking expired application program publisher tokens to identify replay attack attempts.

2. The method as recited in claim 1, wherein the receiving the indication further comprises:
authenticating the indication;
upon a successful authentication of the indication:
wherein the recording the selection of the displayed online asset further comprises, recording that the selection of the displayed online asset was of a valid displayed online asset;
upon an unsuccessful authentication of the indication:
wherein the recording the selection of the displayed online asset further comprises, recording that the selection of the displayed online asset was of an invalid displayed online asset.

3. The method as recited in claim 2, further comprising:
causing, by the server, display of a fraudulent content alert based on a recorded number of selections of invalid displayed content.

4. The method as recited in claim 2, wherein the authenticating the indication further comprises:
validating a signature included in the indication.

5. The method as recited in claim 2, wherein the upon an unsuccessful authentication of the indication further comprises:
wherein the response is informing the application program of the invalid displayed asset.

6. The method as recited in claim 1, further comprising:
causing, by the server, display of a suspicious activity alert based on a recorded number of invalid requests from application programs.

7. The method as recited in claim 1, wherein the authenticating the publisher further comprises:
validating a publisher signature included in the request.

8. The method as recited in claim 1, wherein each online asset of the one or more online assets includes an instruction to send an indication to the server upon user selection of that online asset.

9. The method as recited in claim 1, wherein the one or more online assets are targeted to a particular voter segment.

10. The method as recited in claim 1, further comprising:
causing, by the server, display of the progress of a particular online political asset campaign that includes the one or more online assets.

11. One or more non-transitory computer-readable media, storing one or more sequences of instructions for tracking the display of online content assets, wherein execution of the one or more sequences of instructions by one or more processors causes the one or more processors to perform:
receiving, by a server, a request for online content assets from an application program executing on a client device, the request including an application program publisher token;
authenticating, by the server, a publisher of the application program by:
decoding the application program publisher token using a shared secret key; and
determining whether the application program publisher token has expired;
upon a successful authentication of the publisher:
directing the application program to one or more online content asset URLs, each URL containing a server token, the application program displays information associated with the one or more online content assets to a user;
recording that the one or more content asset URLs have been sent to the client device;
receiving, by the server, an indication from the application program that the user has selected a displayed online content asset of the one or more displayed online content assets, the indication including an associated server token for the selected displayed online content asset;
recording, by the server, the selection of the displayed online content asset; and
based on a determination that the associated server token is valid, directing, by the server, the application program to a URL for an online content asset associated with the selected displayed online content asset, the URL containing a second server token; and
upon an unsuccessful authentication of the publisher:
recording, by the server, an invalid request from the application program; and
tracking expired application program publisher tokens to identify replay attack attempts.

12. The one or more non-transitory computer-readable media as recited in claim 11, wherein the receiving the indication further comprises:
authenticating the indication;
upon a successful authentication of the indication:
wherein the recording the selection of the displayed online asset further comprises, recording that the selection of the displayed online asset was of a valid displayed online asset;
upon an unsuccessful authentication of the indication:
wherein the recording the selection of the displayed online asset further comprises, recording that the selection of the displayed online asset was of an invalid displayed online asset.

13. The one or more non-transitory computer-readable media as recited in claim 12, wherein the execution of the one or more sequences of instructions by the one or more processors causes the one or more processors to further perform:
causing, by the server, display of a fraudulent content alert based on a recorded number of selections of invalid displayed content.

14. The one or more non-transitory computer-readable media as recited in claim 12, wherein the upon an unsuccessful authentication of the indication further comprises:
wherein the response is informing the application program of the invalid displayed asset.

15. The one or more non-transitory computer-readable media as recited in claim 11, wherein the execution of the one or more sequences of instructions by the one or more processors causes the one or more processors to further perform:
causing, by the server, display of a suspicious activity alert based on a recorded number of invalid requests from application programs.

16. The one or more non-transitory computer-readable media as recited in claim 11, wherein the authenticating the publisher further comprises:
validating a publisher signature included in the request.

17. The one or more non-transitory computer-readable media as recited in claim 11, wherein each online asset of the one or more online assets includes an instruction to send an indication to the server upon user selection of that online asset.

18. The one or more non-transitory computer-readable media as recited in claim 11, wherein the one or more online assets are targeted to a particular voter segment.

19. The one or more non-transitory computer-readable media as recited in claim 11, wherein the execution of the one or more sequences of instructions by the one or more processors causes the one or more processors to further perform:
   causing, by the server, display of the progress of a particular online political asset campaign that includes the one or more online assets.

20. An apparatus for tracking the display of online content assets, comprising:
   one or more processors; and
   a memory storing instructions, which when executed by the one or more processors, cause the one or more processors to:
      receive a request for online content assets from an application program executing on a client device, the request including an application program publisher token;
      authenticate a publisher of the application program using the request by:
         decoding the application program publisher token using a shared secret key; and
         determining whether the application program publisher token has expired;
      upon a successful authentication of the publisher:
         direct the application program to one or more online content asset URLs, each URL containing a server token, the application program displays information associated with the one or more online content assets to a user;
         record that the one or more content asset URLs have been sent to the client device;
         receive an indication from the application program that the user has selected a displayed online content asset of the one or more displayed online content assets, the indication including an associated server token for the selected displayed online content asset;
         record the selection of the displayed online content asset; and
         based on a determination that the associated server token is valid, direct the application program to a URL for an online content asset associated with the selected displayed online content asset, the URL containing a second server token; and
      upon an unsuccessful authentication of the publisher:
         record an invalid request from the application program; and
         track expired application program publisher tokens to identify replay attack attempts.

\* \* \* \* \*